United States Patent [19]

Earl et al.

[11] 3,738,597

[45] June 12, 1973

[54] AIRCRAFT UNDERCARRIAGE

[75] Inventors: T. Desmond Earl, Buffalo; Vincent B. Paxhia, Kenmore, both of N.Y.

[73] Assignee: Textron Inc., Providence, R.I.

[22] Filed: Jan. 4, 1971

[21] Appl. No.: 103,756

[52] U.S. Cl. .............................. 244/102 R, 180/129
[51] Int. Cl. ....................... B64c 25/00, B60v 3/08
[58] Field of Search ................. 244/100 R, 102 R, 244/103 R; 180/129, 128

[56] References Cited
UNITED STATES PATENTS

| | | | |
|---|---|---|---|
| 2,944,771 | 7/1960 | Bush | 244/100 R |
| 3,291,236 | 12/1966 | Foshag et al. | 180/129 X |
| 3,414,077 | 12/1968 | Earl | 244/100 R X |
| 3,462,100 | 8/1969 | De Valroger | 244/100 R |

Primary Examiner—Milton Buchler
Assistant Examiner—Paul E. Sauberer
Attorney—Bean & Bean

[57] ABSTRACT

A pressure-air activated type undercarriage system for aircraft such as shown in U.S. Reissue Pat. No. 26,812, comprising in combination; an inflatable trunk member carried under the aircraft fuselage, and a source of compressed air (or other fluid) in conjunction therewith; the trunk being jet-apertured along the footprint area thereof to provide a fluid-film lubricated undercarriage system when operating in one mode; and a secondary load supporting, fluid-tight, variably inflatable bladder or bladders disposed interiorly of the trunk and selectively inflatable to various degrees independently of inflation of the trunk member. Thus the aircraft is capable of being "parked" on a solid or fluid "airport" surface; or it may be caused to "kneel" or "squat" in any preferred attitude or elevation relative to the surface, so as to facilitate passenger/cargo loading/unloading operations while requiring no continuing compressed fluid supply to the undercarriage system. Adjunctively, the inner bladder may be pilot-inflated to any desired degree, and then maintained in such inflated condition by simply closing an appropriate valve in the control system; whereby the airplane undercarriage is then operable in floatation mode although the compressed air supply engine(s) of the craft may be shut down.

7 Claims, 10 Drawing Figures

Patented June 12, 1973

INVENTORS
T. DESMOND EARL
VINCENT B. PAXHIA
BY
*Bean & Bean*
ATTORNEYS

INVENTORS
T. DESMOND EARL
VINCENT B. PAXHIA
BY
ATTORNEYS

Patented June 12, 1973
3,738,597
5 Sheets-Sheet 3
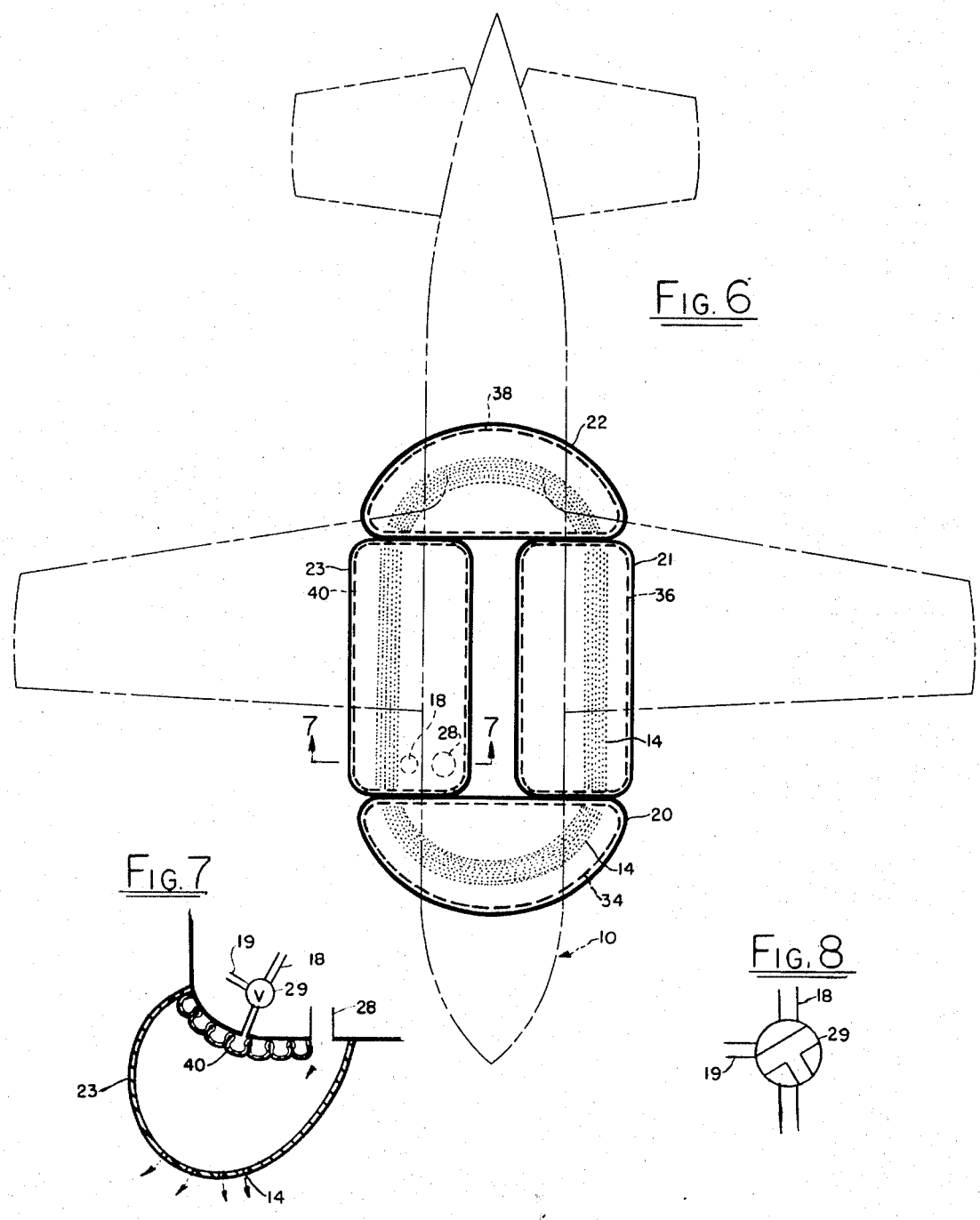
INVENTORS
T. DESMOND EARL
VINCENT B. PAXHIA
BY
Bean & Bean
ATTORNEYS

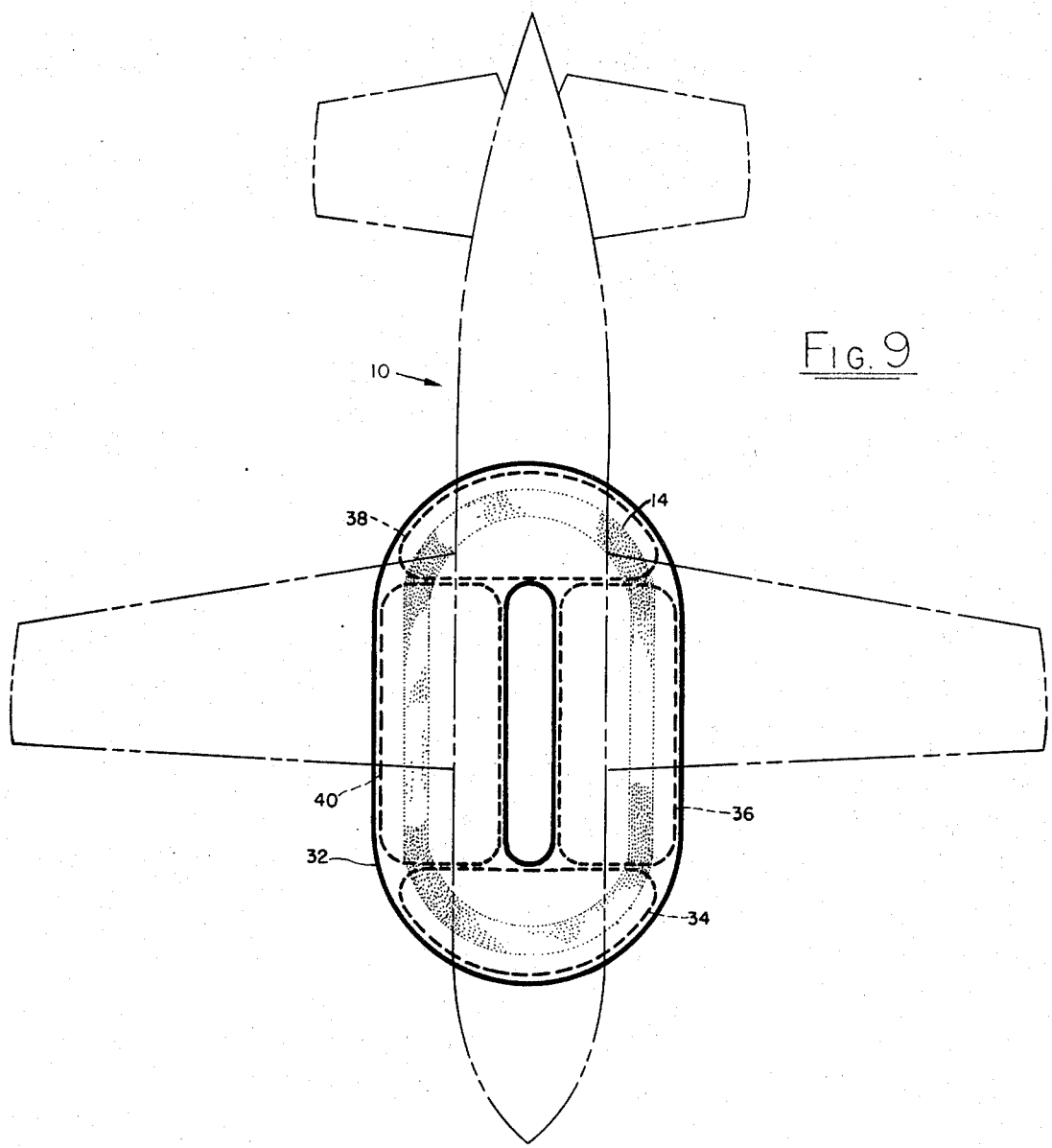

AIRCRAFT UNDERCARRIAGE

BACKGROUND AND BRIEF DESCRIPTION

This invention provides an adjunct to air cushion type undercarriage systems for aircraft such as disclosed for example in U.S. Reissue Pat. No. 26,812 and U.S. Pat. No. 3,414,077; wherein air inflatable trunks formed of flexible sheet material with jet apertures at the footprint area thereof are employed to define the aircraft support air cushion area; and wherein a supply of compressed air or the like is provided for transitory inflation of the trunk and for supplying fluid under pressure to project through said apertures to provide therebelow a fluid film supporting said trunk above the reaction surface while at the same time feeding the aircraft support fluid cushion area.

In accordance with the present invention there is also provided an air/gas-tight flexible bladder disposed interiorly of the trunk and separately connected to a source of pressured air for independent selective inflation to various degrees; whereby to provide a water-air-tight flotation cell for buoying the aircraft when resting on a water surface, as well as to provide a variable height support device for said aircraft when resting upon any solid or fluid surface. Thus, the vehicle is enabled to "squat" to any appropriate degree relative to an "airport" surface such as may be requisite to facilitate passenger or cargo loading-unloading operations.

Also the invention contemplates that the trunk system may be divided into a plurality of jet-apertured cells each having therewithin its own variably inflatable air-water-tight bladder, whereby upon differential inflationings of the bladders the craft may be caused to "kneel" at any desired attitude relative to the horizontal, to facilitate various loading/unloading operations.

DETAILED DESCRIPTION

The invention is described hereinafter and illustrated by way of example in the accompanying drawing, wherein:

THE DRAWING

FIG. 1 is a side elevational view of an airplane equipped with an air cushion type undercarriage of the present invention; illustrating the airplane as being "parked" at its maximum elevation upon an airport surface or the like;

FIG. 6 is a schematic bottom plan view of a vehicle hull, illustrating use of a plurality of independent trunk-bladder units, such as are differentially operable to enable the vehicle to perform "kneeling" operations;

FIG. 7 is a fragmentary inverted sectional view taken as indicated by line 7—7 of FIG. 6, incidentally illustrating a modified form of bladder construction, shown therein as being in contracted condition;

FIG. 8 is an enlarged scale diagrammatic view illustrating a suitable form of valve device as shown in FIG. 7;

FIG. 9 is a view corresponding to FIG. 6, showing a still further modified form of undercarriage of the invention.

Figure 1:
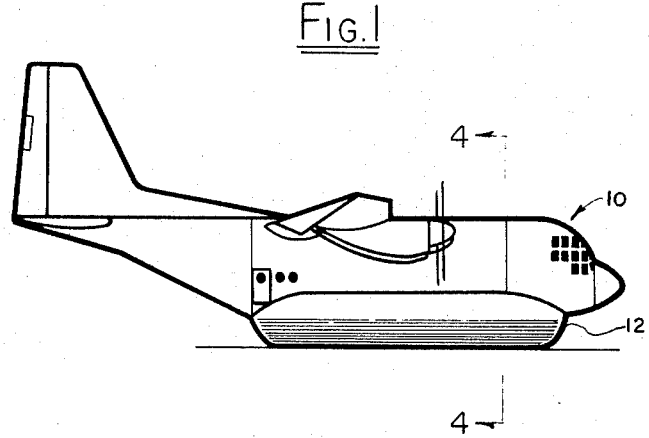

It is to be understood that the invention is applicable to any type aircraft. However, as illustrated by way of example in the drawing herewith the invention is applied to an airplane comprising in general a fuselage structure designated 10, to the hull portion of which is attached an air-inflatable "trunk" device 12 which in this instance is of rectangularly-toroidal shaped plan form. The trunk 12 is provided with air-jet escape slots or perforations 14; as in accordance for example with the disclosures of U.S. Pat. No. 3,275,270. As explained therein, compressed air supply means are operably coupled to the trunk device and so controlled as to enable the craft to operate in taxiing, take-off, and-/or landing maneuvers in improved manner without use of auxiliary equipment such as wheels, skids, floats, or the like. The air supply and control means are not shown herein, in order to simplify the present drawing and specification.

In accordance with a preferred example of the present invention, an air-tight flexible bladder as illustrated at 16 (FIGS. 4-7) is provided interiorly of the trunk structure, and is coupled to a separate and selectively controlled compressed air inlet (or inlets) as shown at 18; whereby the bladder may be inflated to any desired degree according to the nature of the operational maneuver to be performed. The bladder operation is under control of the vehicle operator by means of a suitable valve arrangement, as will be explained hereinafter. An air pressure vent outlet (or outlets) as shown at 19 may also be provided if preferred, to facilitate rapid deflation of the bladder 16 whenever required in accordance with a vehicle maneuvering program change, as will also be explained hereinafter.

Whereas, the aircraft will typically operate in landing, taxiing, and take-off modes in accordance with the teachings of U.S. Pat. No. 3,275,270, the present invention enables an aircraft of the type referred to hereinabove (or any other form of air or pressurized fluid supported vehicle) to set or "ride" upon any solid or fluid surface in improved manner; the trunk-bladder combination being operationally functional to provide buoyancy for the craft relative to any such surface albeit the pressured fluid supply system is idle. This is because the bladder 16 (when inflated and expanded) per se provides a flotation cell for the vehicle. Hence, although the jet apertures 14 through the trunk device 12 prevent the latter from functioning as a levitation cell when its compressed fluid supply is deenergized, the bladder 16 is extensible (under operator control) to functionally replace the trunk structure in this respect.

Furthermore, it is a particular feature of the present invention that the bladder 16 may be selectively inflated-deflated to any desired degree; whereby to provide support for the craft at any preferred elevation above the reaction surface; whether it be a solid runway or other ground or marsh or snow or water surface, or the like. Thus for example, upon taxiing to a loading or unloading station, the engines of the craft may be stopped (or idled) thus permitting the craft to settle down upon the water or runway surface, while still enabling the operator to controllably deflate the bladder 16 so as to permit the hull of the craft to lower to any preferred elevation above the support surface. The loading/unloading operation will of course be thereby facilitated; the craft being thus enabled to "squat" down to the level most appropriate for the loading/unloading operation.

Figure 2:
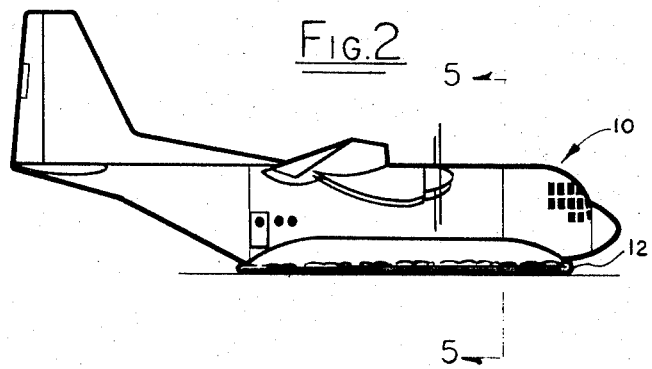
FIG. 2 is a view corresponding to FIG. 1, but illustrating the airplane as being "squatted" down to a lower elevation on the surface, to facilitate loading/unloading operations.
Figure 3:
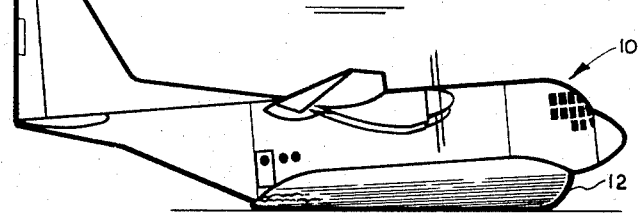
FIG. 3 is a view corresponding to FIGS. 1 and 2, but illustrating the airplane as "kneeling" at an angle to the surface, thereby facilitating another mode of loading-/unloading operations.

As illustrated at FIG. 6, in one form of the invention the trunk system may comprise a plurality of separately inflatable cells; each having its own separately inflatable bladder. As shown therein by way of example, the cells may be four in number, as designated at 20, 21, 22, 23; having individual bladders 34, 36, 38, 40, respectively. Accordingly, the aircraft operator is provided with means (upon differential inflation of the bladders of the cells 20, 21, 22, 23) to cause the craft to "kneel" at any desired elevation and attitude relative to the support surface (whether solid or fluid) as illustrated by FIGS. 1, 2, 3, of the drawing herewith, whereby to facilitate loading/unloading of the vehicle.

Figure 4:
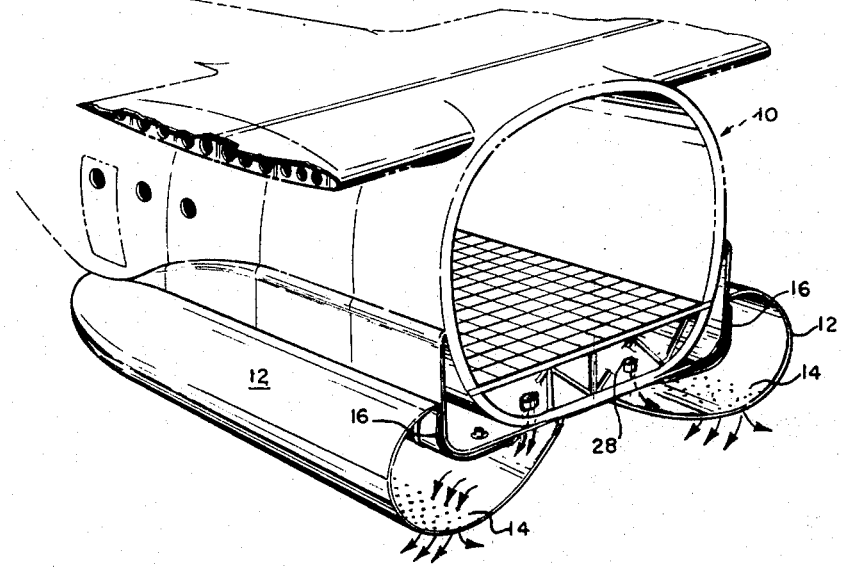
FIG. 4 is an enlarged scale fragmentary sectional view, taken as indicated by line 4—4 of FIG. 1, showing the undercarriage trunk and bladder elements in operative condition during landing, taxiing, and take-off operations.
Figure 5:
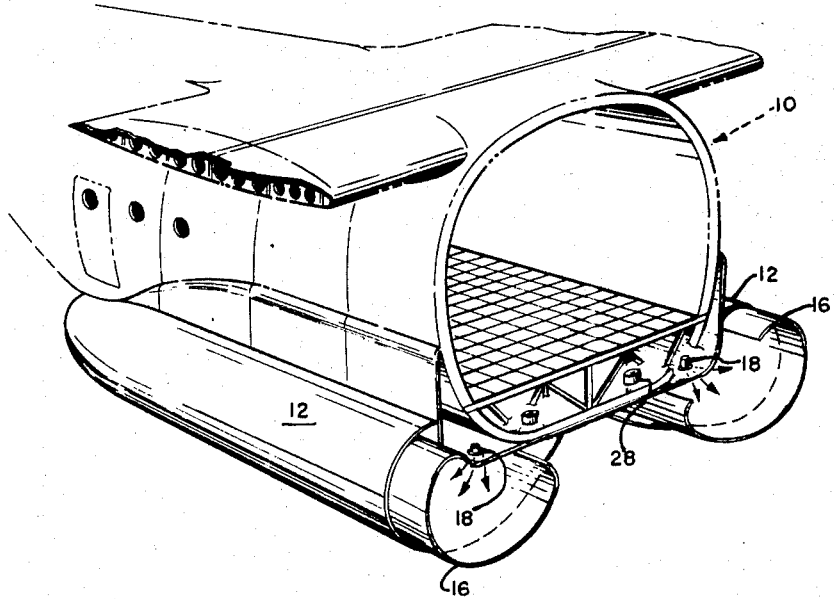
FIG. 5 is a view corresponding to FIG. 4, but showing the undercarriage trunk and bladder elements as being operable under "parking" conditions.

FIG. 7 illustrates use of a modified form of inner bladder, wherein the latter is formed of flexible airtight sheet material as distinguished from resilient airtight sheet material as illustrated by way of example at FIGS. 4, 5. Thus, if the bladder is fabricated of non-resilient flexible material it will contract against the hull of the aircraft somewhat in the manner illustrated at FIG. 7, whenever the aircraft operator adjusts the control valve system so as to evacuate air from within the bladder. If desired, some suitable mechanical device may be employed in conjunction with the flexible bladder fabrication, such as pull straps or the like disposed girthwise of the bladder in such manner that the pull straps may be operated so as to draw the bladder when evacuated into more snuggly fitting relation against the hull of the aircraft. However, in any case whenever air under pressure is admitted, as through valve 29, the bladder device will balloon out, and will occupy the desired space within the trunks, as explained hereinabove. FIG. 8 provides a diagrammatic illustration of a suitable type valve for this control purpose.

Figure 10:
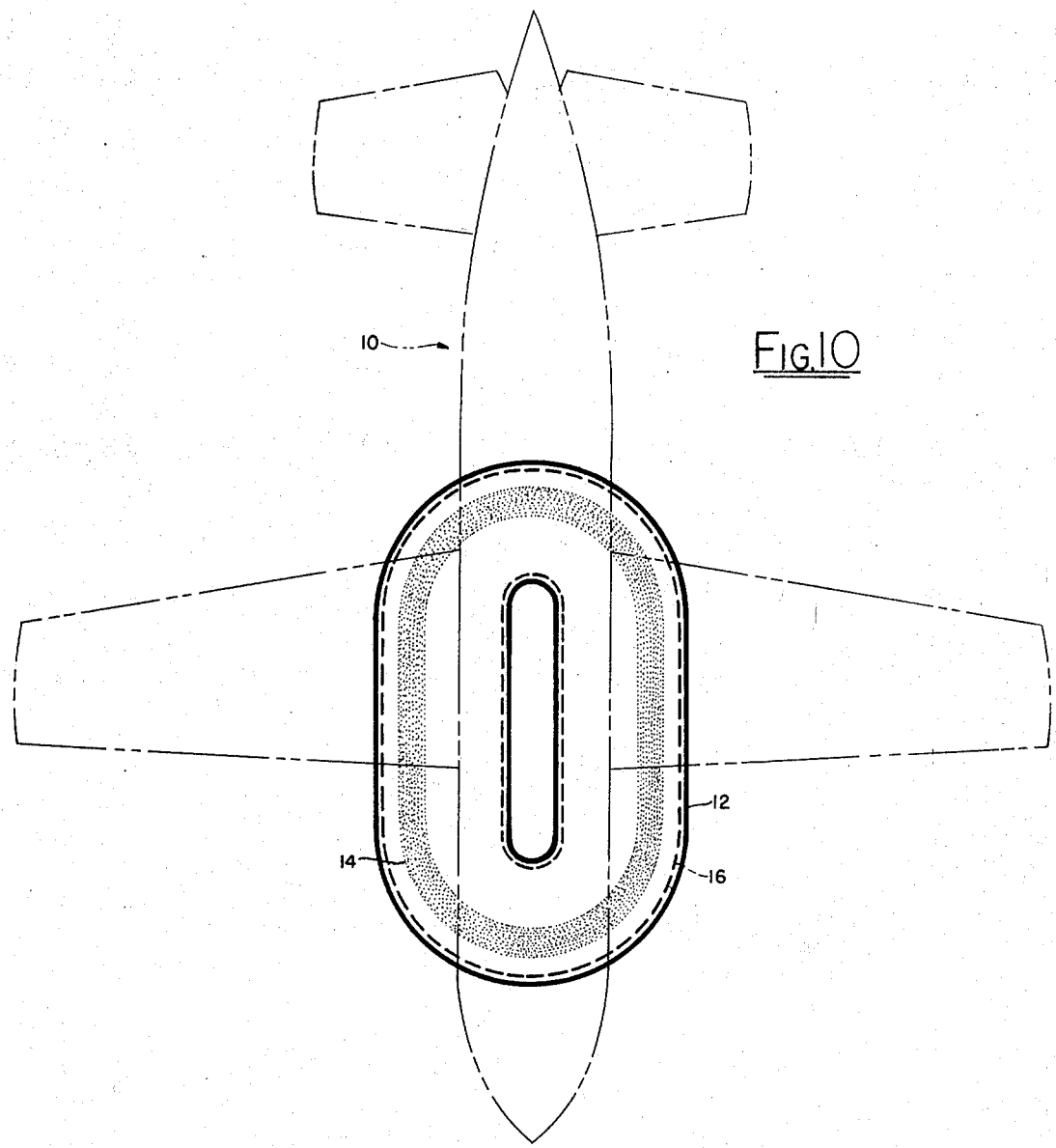
FIG. 10 is a view corresponding to FIG. 9, but showing still another form of undercarriage of the invention.

FIG. 9 illustrates a modified form of undercarriage construction wherein a single torus-shaped outer casing member 32 is attached to the undersurface of the aircraft hull, and a plurality of separate bladders are provided internally of the casing member, as indicated at 34, 36, 38, 40. Thus, it will be appreciated that the bladders may be separately inflated-deflated under control of the aircraft operator so as to provide either simultaneous inflation-evacuations of the bladders to the same degree; or, differential operations thereof so that the craft may be caused to kneel or squat relative to a support surface, as explained hereinabove. As illustrated at FIG. 10, a single torus shaped outer casing or trunk 42 may be employed in combination with a single bladder 44. However, an undercarriage of this construction is operable only to provide any desired degree of flotation or elevation relative to the aircraft support surface, whether it be land or water.

It will be understood that in any case the shell of the trunk structure provides a structural support for its internal bladder; limiting its ultimate degree of inflation while at the same time mechanically reinforcing and protecting it from external abrasion damage. Hence, whereas the trunk fabrication will preferably be of relatively heavy and wear-resistant sheet material, the bladder may be formed of relatively thin and lightweight rubber sheet material or the like. As explained hereinabove when the bladder is fully inflated it operates to seal off the apertures through the trunk wall, thereby converting the trunk structure into an airtight cell system. Thus, the vehicle may be brought in to land for example under emergency conditions upon any available water, snow, wet grass, or foamed runway, or the like; the bladder system operating to provide ample buoyancy to support the craft relative to any kind of landing surface. This combination of functional components thereby provides a totally novel overall operational facility for vehicles of the airplane or ground effect or air cushion types.

We claim:

1. A dual mode operative aircraft undercarriage trunk system comprising in combination, an air inflatable casing member attached to the aircraft fuselage and adapted to be inflated so as to balloon-out from the aircraft fuselage for air cushion type support of the aircraft relative to a reaction surface, said casing member being formed of flexible airtight sheet material adapted to expand in response to internal air pressure into a balloon-shape of prescribed form and dimensions, a bladder member formed of airtight flexible sheet material disposed interiorly of said casing member, conduit means carrying separate supplies of compressed air into the interiors of said casing member and said bladder member, respectively, valve means under control of the aircraft operator for regulating the supply of compressed air to said casing and bladder members, respectively, and for controlling evacuation of said bladder member, said casing member being apertured along the lowermost surface portion thereof whereby to permit escape of air from within said casing when said casing is inflated, and means for causing said trunk system to contract into fuselage-hugging position when uninflated, whereby when the aircraft is operating in flight mode the operator may cause the trunk system to contract compactly against the aircraft fuselage, and whereby the aircraft may be prepared for landing, taxiing, and take-off operations by pilot control of said valve means so as to cause said outer casing member to expand and discharge air therebelow so as to create a transient air-cushion between the aircraft and a reaction surface, and whereby the operator may actuate said valve means so as to inflate said bladder member to any desired degree whereby to provide interiorly of said casing member a confined air-cushion support for the aircraft when resting upon a ground or water surface or the like.

2. An aircraft undercarriage trunk system as set forth in claim 1 wherein said casing member is formed substantially of elastic sheet material.

3. An aircraft undercarriage trunk system as set forth in claim 1 wherein said bladder member is formed substantially of elastic sheet material.

4. An aircraft undercarriage trunk system as set forth in claim 1 wherein said means for causing said trunk system to contract when uninflated comprises a mechanically operated retraction system.

5. An aircraft having a plurality of undercarriage trunk systems as set forth in claim 1.

6. An aircraft as set forth in claim 5 wherein said trunk systems are arranged in fore-aft directionally aligned relation under said aircraft.

7. An aircraft as set forth in claim 5 wherein said trunk systems are disposed at opposite sides of said aircraft.

* * * * *